(12) United States Patent
Kim

(10) Patent No.: US 11,763,833 B2
(45) Date of Patent: Sep. 19, 2023

(54) METHOD AND DEVICE FOR REDUCING CROSSTALK IN AUTOMATIC SPEECH TRANSLATION SYSTEM

(71) Applicant: Jung Keun Kim, Daejeon (KR)

(72) Inventor: Jung Keun Kim, Daejeon (KR)

( * ) Notice: Subject to any disclaimer, the term of this patent is extended or adjusted under 35 U.S.C. 154(b) by 188 days.

(21) Appl. No.: 17/290,047

(22) PCT Filed: Oct. 31, 2019

(86) PCT No.: PCT/KR2019/014645
§ 371 (c)(1),
(2) Date: Apr. 29, 2021

(87) PCT Pub. No.: WO2020/091482
PCT Pub. Date: May 7, 2020

(65) Prior Publication Data
US 2021/0407530 A1 Dec. 30, 2021

(30) Foreign Application Priority Data
Oct. 31, 2018 (KR) .................. 10-2018-0132328

(51) Int. Cl.
*G10L 21/0272* (2013.01)
*G06F 40/58* (2020.01)
(Continued)

(52) U.S. Cl.
CPC .......... *G10L 21/0272* (2013.01); *G06F 40/58* (2020.01); *G10L 13/02* (2013.01); *G10L 25/78* (2013.01)

(58) Field of Classification Search
CPC ..... G10L 21/0272; G10L 13/02; G10L 25/78; G10L 13/00; G10L 21/0208;
(Continued)

(56) References Cited

U.S. PATENT DOCUMENTS 10,819,953 B1\* 10/2020 Lovitt .................. G06F 16/487
2008/0037801 A1\* 2/2008 Alves ...................... H04R 3/04
381/74
(Continued)

FOREIGN PATENT DOCUMENTS

JP 2001/251429 A 9/2001
KR 2007/0019929 A 2/2007
(Continued)

OTHER PUBLICATIONS

International Search Report for International Application No. PCT/KR2019/014645 dated Feb. 10, 2020.

*Primary Examiner* — Fariba Sirjani
(74) *Attorney, Agent, or Firm* — Alexander Akhiezer; Erik A. Huestis; Foley Hoag LLP

(57) ABSTRACT

Disclosed are a method, a device, and a computer-readable storage medium for reducing crosstalk when performing automatic speech translation between at least two users speaking different languages. The method for reducing crosstalk includes receiving a signal inputted to an out-ear microphone of a first user, wherein the first user is wearing a headset equipped with an in-ear microphone and the out-ear microphone and the signal includes a voice signal A of the first user and a voice signal b of a second user, receiving a voice signal $B_{inear}$ inputted to an in-ear microphone of the second user, wherein the second user is wearing a headset equipped with the in-ear microphone and an out-ear microphone, and removing the voice signal b of the second user from the signal A+b inputted to the out-ear microphone of the first user, based on the voice signal $B_{inear}$ inputted to the in-ear microphone of the second user.

10 Claims, 6 Drawing Sheets

(51) Int. Cl.
*G10L 13/02* (2013.01)
*G10L 25/78* (2013.01)

(58) Field of Classification Search
CPC ........... G10L 2021/02087; G10L 13/08; G10L 25/93; G06F 40/58
See application file for complete search history.

(56) References Cited

U.S. PATENT DOCUMENTS

| | | | | |
|---|---|---|---|---|
| 2012/0197635 | A1* | 8/2012 | Nystrom | H04R 3/005 |
| | | | | 704/201 |
| 2014/0355775 | A1* | 12/2014 | Appelbaum | H04R 29/005 |
| | | | | 381/71.1 |
| 2016/0072958 | A1* | 3/2016 | McIntosh | H04R 3/005 |
| | | | | 455/416 |
| 2016/0078881 | A1* | 3/2016 | Shin | G10L 21/038 |
| | | | | 381/74 |
| 2016/0104501 | A1* | 4/2016 | Weingold | G10L 21/0208 |
| | | | | 381/71.1 |
| 2016/0171964 | A1* | 6/2016 | Kim | H04R 3/02 |
| | | | | 381/71.11 |
| 2017/0249954 | A1* | 8/2017 | Kim | H04R 1/1016 |
| 2021/0407530 | A1* | 12/2021 | Kim | G10L 25/78 |

FOREIGN PATENT DOCUMENTS

| | | |
|---|---|---|
| KR | 2015/0045203 A | 4/2015 |
| KR | 2016/0062666 A | 6/2016 |
| WO | WO-2016/093974 A1 | 6/2016 |

* cited by examiner

METHOD AND DEVICE FOR REDUCING CROSSTALK IN AUTOMATIC SPEECH TRANSLATION SYSTEM

CROSS-REFERENCE TO RELATED APPLICATIONS

This application is the U.S. National Stage of International Application PCT/KR2019/014645, filed Oct. 31, 2019, which claims the benefit of Korean Application No. 10-2018-0132328, filed on Oct. 31, 2018, each of which is hereby incorporated by reference in its entirety.

TECHNICAL FIELD

The present disclosure relates to a method and a device for reducing crosstalk. More particularly, the present disclosure relates to a method and a device for reducing crosstalk due to voice signals other than a speaker's own voice in an automatic speech translation system.

BACKGROUND ART

With the development of transportation and communication means, human and material exchanges between countries have become active. Accordingly, demand for translation and speech translation among individuals or groups speaking different languages has gradually increased. However, while demand for professional interpreters is increasing, it is difficult for ordinary people to use professional interpreters due to the shortage and cost of professional interpreters.

Since the 1990s, as various basic technologies have evolved, research on automatic speech translation has been actively conducted based on these basic technologies.

Automatic speech translation refers to a technology that converts language A spoken by a speaker into another language B through processes such as speech recognition and automatic translation, and then outputs the converted language B as subtitles, or synthesizes the converted language B into speech to output the synthesized speech via a loudspeaker. In other words, the automatic speech translation consists of three component technologies: speech recognition, automatic translation, and speech synthesis.

Among these three component technologies, speech recognition for automatic speech translation has several issues that need to be addressed. First of all, speech recognition needs to be very accurate. Since an automatic translation module is more sensitive to speech recognition errors than a language processing module such as search, language spoken by a speaker has to be inputted to an automatic translation module after processing by a speech recognition module. In addition, since speech processed by the automatic speech translation is generally conversational speech, speech recognition for automatic speech translation is very difficult.

Moreover, automatic speech translation is not always performed only in quiet places. The automatic speech translation may be performed in places where various noises occur, such as on the street where other people's voices may be inputted and in conference rooms where multiple people are meeting, especially in situations where voices of other speakers are present. Accordingly, speech recognition used in automatic speech translation requires more advanced technology in terms of noise removal than speech recognition used in other applications.

Automatic speech translation in which speech translation only from language A into language B is performed, such as automatic speech translation of broadcast news, is referred to as one-way automatic speech translation. When two or more people speaking different languages speak in a conference room or in a conference call, automatic speech translation from language A into language B or from language B into language A is performed. This automatic speech translation is referred to as two-way automatic speech translation.

In the case of two-way automatic speech translation, noise due to other people's voices and noise caused by the environment other than humans are mixed. In the present specification, the type of noise is classified into noise caused by other people's voices and noise caused by the environment other than humans. The former is referred to as crosstalk, and the latter is referred to as environmental noise.

In the process of speech recognition, it has been recognized that environmental noise has a much greater impact and is more difficult to remove, as compared to crosstalk. Since frequency domains of the voice noise (crosstalk) and the environmental noise are significantly different, it is relatively easy to separate the environmental noise from a speaker's original voice. However, when a voice of a speaker A and a voice of a speaker B are mixed, since the two voices have similar frequency domains, it is very difficult to separate them from each other.

In view of the above, there is a need for an improved method to reduce crosstalk when performing automatic speech translation between at least two users speaking different languages.

DISCLOSURE OF INVENTION

Technical Problem

The present disclosure is directed to providing a method and a device for reducing crosstalk caused by a voice signal other than a voice of a speaker A to be speech translated, in a speech recognition process of an automatic speech translation system.

Solution to Problem

In a first embodiment of the present disclosure, a method for reducing crosstalk when performing automatic speech translation between at least two users speaking different languages is provided. The method includes receiving a signal inputted to an out-ear microphone of a first user, wherein the first user is wearing a headset equipped with an in-ear microphone and the out-ear microphone and the signal includes a voice signal A of the first user and a voice signal b of a second user, receiving a voice signal $B_{inear}$ inputted to an in-ear microphone of the second user, wherein the second user is wearing a headset equipped with the in-ear microphone and an out-ear microphone, and removing the voice signal b of the second user from the signal A+b inputted to the out-ear microphone of the first user based on the voice signal $B_{inear}$ inputted to the in-ear microphone of the second user.

In a second embodiment of the present disclosure, the method may further include, prior to removing the voice signal b, discriminating, by a voice activity detection (VAD) module, between a voice section in which a voice of a user is inputted and a non-voice section in which a voice of a user is not inputted, wherein removing the voice signal b may be performed only on the voice section.

In a third embodiment of the present disclosure, removing the voice signal b may further include extracting, by a voice pattern matching module, a signal component matching the voice signal $B_{inear}$ inputted to the in-ear microphone of the second user from the signal A+b inputted to the out-ear microphone of the first user, and removing the signal component matching the voice signal $B_{inear}$ inputted to the in-ear microphone of the second user from the signal A+b inputted to the out-ear microphone of the first user.

In a fourth embodiment of the present disclosure, the method may further include translating the voice signal of the first user from which the voice signal b of the second user has been removed, into another language, and synthesizing the translated sentence into speech to output the synthesized speech.

In a fifth embodiment of the present disclosure, a device for reducing crosstalk when performing automatic speech translation between at least two users speaking different languages is provided. The device includes at least one processor and a memory coupled to the at least one processor.

The at least one processor is configured to receive a signal inputted to an out-ear microphone of a first user, wherein the first user is wearing a headset equipped with an in-ear microphone and the out-ear microphone and the signal includes a voice signal A of the first user and a voice signal b of a second user, receive a voice signal $B_{inear}$ inputted to an in-ear microphone of the second user, wherein the second user is wearing a headset equipped with the in-ear microphone and an out-ear microphone, and remove the voice signal b of the second user from the signal A+b inputted to the out-ear microphone of the first user, based on the voice signal $B_{inear}$ inputted to the in-ear microphone of the second user.

In a fifth embodiment of the present disclosure, a computer-readable storage medium in which a program for reducing crosstalk when performing automatic speech translation between at least two users speaking different languages is stored, is provided. The program, when executed by a computer, causes the computer to: receive a signal inputted to an out-ear microphone of a first user, wherein the first user is wearing a headset equipped with an in-ear microphone and the out-ear microphone and the signal includes a voice signal A of the first user and a voice signal b of a second user, receive a voice signal $B_{inear}$ inputted to an in-ear microphone of the second user, wherein the second user is wearing a headset equipped with the in-ear microphone and an out-ear microphone, and remove the voice signal b of the second user from the signal A+b inputted to the out-ear microphone of the first user, based on the voice signal $B_{inear}$ inputted to the in-ear microphone of the second user.

Advantageous Effects of Invention

According to some embodiments of the present disclosure, since crosstalk caused by a voice signal of a third party can be removed by using a noise-less signal inputted to an in-ear microphone of the third party, a voice signal of a high-frequency component inputted through an out-ear microphone can be used for automatic speech translation. As a result, since it is possible to significantly reduce the crosstalk caused by the voice signal of the third party, the voice signal of the high-frequency component can be used for automatic speech translation.

DESCRIPTION OF EMBODIMENTS

Figure 1:
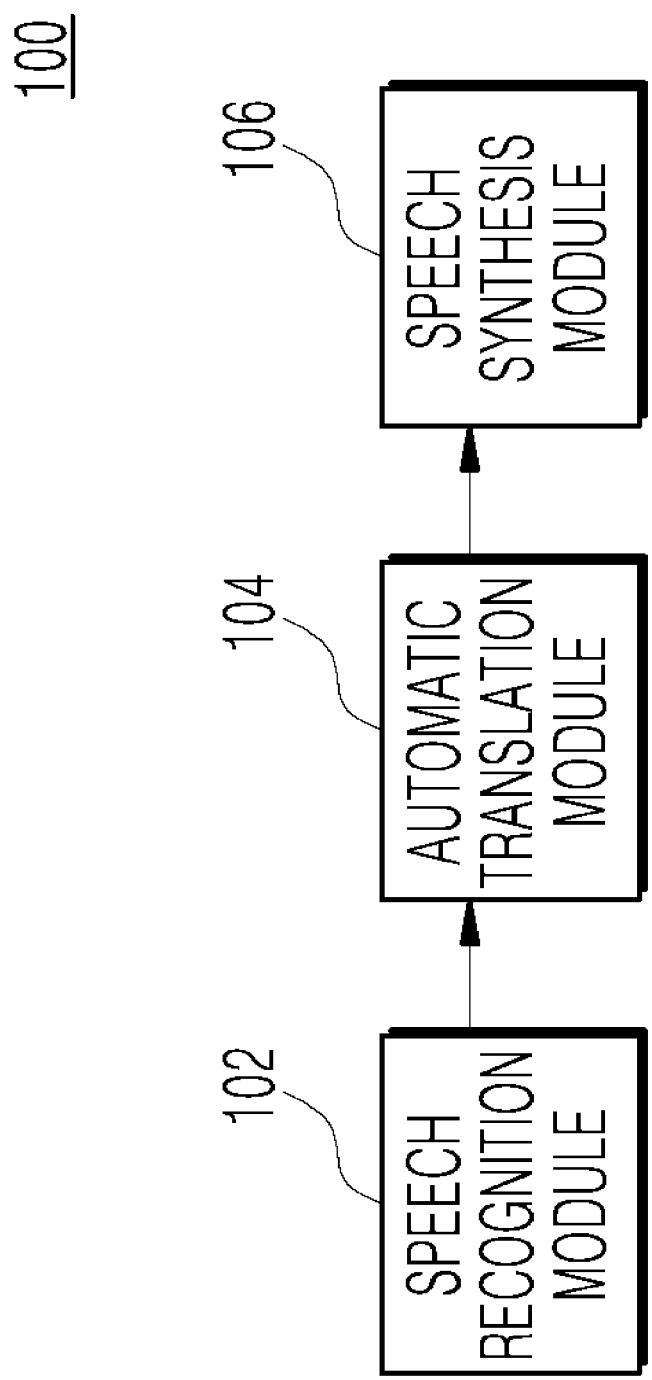
FIG. 1 illustrates component modules of an automatic speech translation device, according to some embodiments of the present disclosure.

Various aspects are described with reference to the drawings, wherein the same reference numerals are used to indicate the same elements throughout the drawings. In the following description, for purposes of description, various details are set forth to provide a thorough understanding of one or more aspects. However, it will be apparent to those skilled in the art that these aspects may be practiced without these details.

Referring to FIG. 1, an automatic speech translation device 100 according to some embodiments of the present disclosure includes a speech recognition module 102, an automatic translation module 104, and a speech synthesis module 106.

The speech recognition module 102 is configured to recognize a voice spoken by a first user speaking language A. Speech recognition is also referred to as automatic speech recognition (ASR) or speech-to-text (STT). The speech recognition module recognizes voice and then outputs a character string.

The automatic translation module 104 is configured to translate a character string of language A into a character string of language B.

The speech synthesis module 106 is configured to output the translated character string as subtitles, or to synthesize the translated character string into speech to output the synthesized speech via a loudspeaker. Speech synthesis is also referred to as text-to-speech (TTS).

Figure 2:
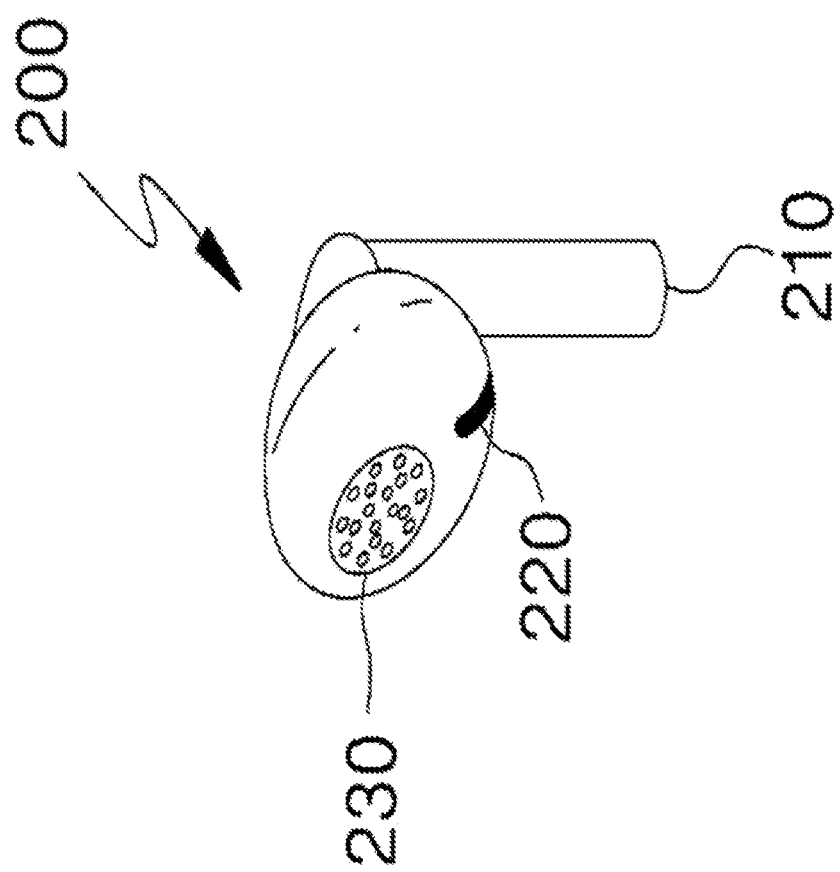
FIG. 2 illustrates a headset equipped with an in-ear microphone, according to some embodiments of the present disclosure.

Referring to FIG. 2, a headset 200 for automatic speech translation that may be worn by a user according to the present disclosure is illustrated.

Similar to an existing headset, the headset 200 includes a loudspeaker 230 and an out-ear microphone 210. When the user is wearing the headset 200, the loudspeaker 230 is located inside ears of the user, and the out-ear microphone 210 is exposed to the outside of the ears of the user and receives the voice of the user.

In addition, the headset 200 further includes an in-ear microphone 220. When the user is wearing the headset 200, the in-ear microphone 220 is located inside the ear and is configured to receive voice vibration of the user.

Accordingly, the headset 200 for automatic speech translation that is worn by a user according to the present disclosure includes two microphones, that is, the in-ear microphone 220 and the out-ear microphone 210.

A signal inputted to the out-ear microphone 210 contains a lot of noise, but has excellent voice quality. On the other hand, since the in-ear microphone 220 is located inside the ears of the user, the in-ear microphone 220 is less exposed to the outside. For this reason, the signal inputted to the in-ear microphone 220 contains significantly less noise, but does not sufficiently contain a high-frequency band component of a human voice. Accordingly, it is difficult for a program or a processor to recognize and process a signal inputted to the in-ear microphone 220.

According to some embodiments of the present disclosure, an in-ear microphone 220b may be used to reduce crosstalk from a voice signal of the user inputted through the out-ear microphone 210, as described below with reference to FIG. 3.

The headset 200 may be connected by wire or wirelessly to an automatic speech translation device so as to transmit an inputted voice signal or to receive other signals. In addition, the headset 200 may be configured to mount, inside the headset, modules, in particular a crosstalk reduction module according to some embodiments of the present disclosure. Further, the headset 200 illustrated in FIG. 2 is merely an example, and as long as the headset includes an in-ear microphone, an out-ear microphone, and a loudspeaker, the headset may be used without being limited in terms of shape or function. For example, as long as the out-ear microphone 210 may receive the voice of the user, the out-ear microphone 210 may have various structures and shapes without the need to extend long from a head of the headset as illustrated in FIG. 2.

Figure 3:
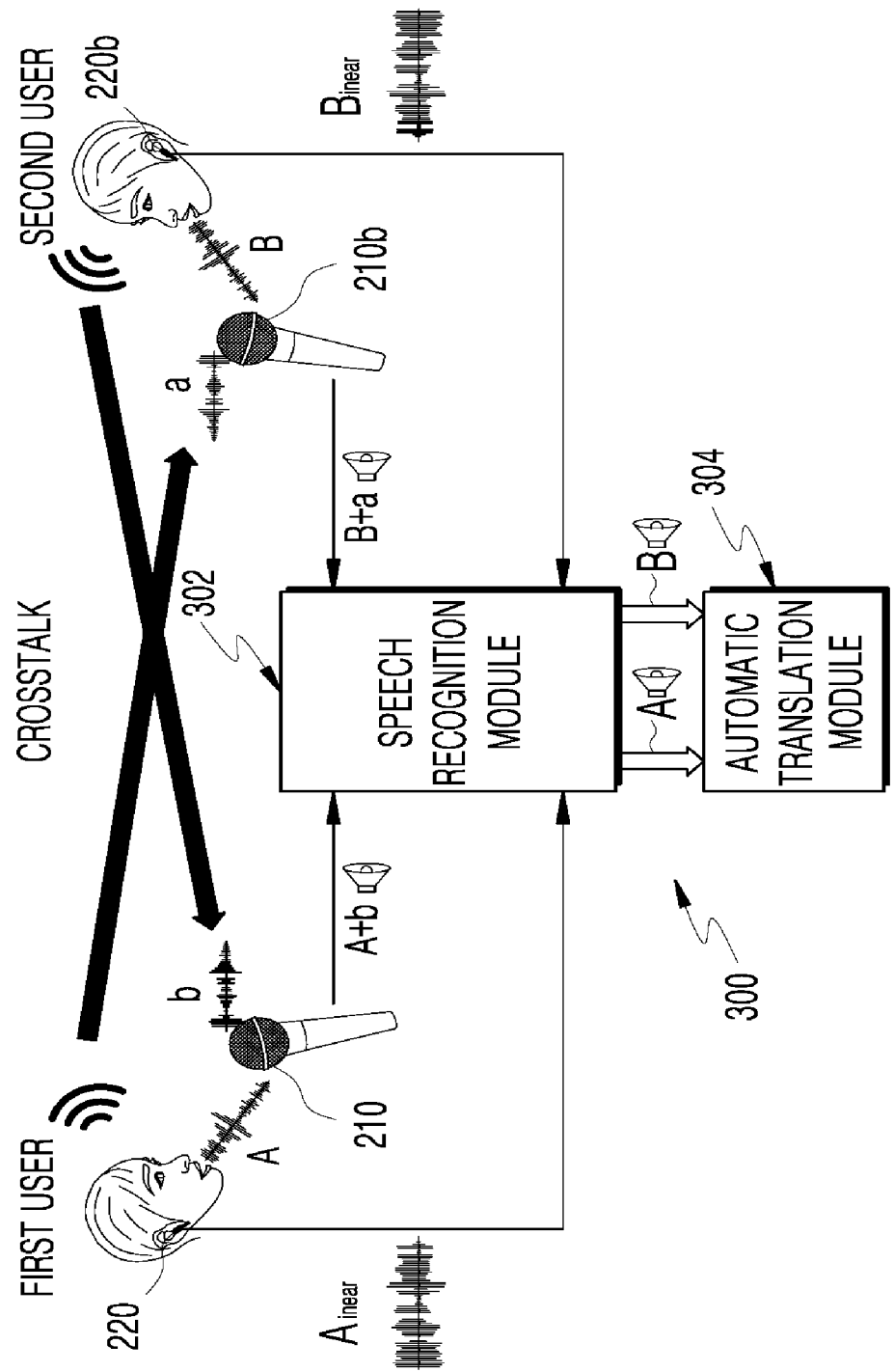
FIG. 3 illustrates a flow of voice signals and crosstalk between an automatic speech translation device and two headsets worn by two users speaking different languages, according to some embodiments of the present disclosure.

FIG. 3 illustrates a flow of voice signals and crosstalk between an automatic speech translation device and two headsets worn by two users speaking different languages, according to some embodiments of the present disclosure.

An automatic speech translation device 300 according to some embodiments of the present disclosure includes a speech recognition module 302 and an automatic translation module 304. The speech recognition module 302 may include a crosstalk reduction module 408. According to this embodiment, the automatic speech translation device 300 is mounted on a separate device from the headset. However, the automatic speech translation device 300 may be embedded in each headset 200. The automatic speech translation device 300 may be embedded in the form of a program in a portable electronic device capable of transmitting and receiving data, such as a mobile phone. In any case, the automatic speech translation device 300 has to have a communication function to transmit and receive signals to and from the headsets of the first and second users.

When the first user speaks a voice signal A requiring speech translation, the voice signal A of the first user is inputted to the out-ear microphone 210 of the headset of the first user. In addition, a voice signal $A_{inear}$ of the first user is inputted to the in-ear microphone 220 of the headset of the first user. For convenience of description and illustration, the out-ear microphones 210 and 210b are illustrated in FIG. 3 as a separate device from the headset of the user. However, it is preferable that the out-ear microphones 210 and 210b are integrally formed with the headset of the user.

On the other hand, the second user may also speak a voice signal at the same time as the first user speaks the voice signal. The voice signal of the second user may be a language requiring speech translation or may just be noise. A voice signal B of the second user is inputted to the out-ear microphone 210b of the headset of the second user. In addition, a voice signal $B_{inear}$ is inputted to the in-ear microphone 220b of the headset of the second user. Further, a voice signal b of the second user is also inputted to the out-ear microphone 210 of the first user. The voice signal b in the out-ear microphone 210 of the first user corresponds to crosstalk.

As a result, the signals inputted to the out-ear microphone 210 of the first user include both the voice signal A of the first user and the voice signal b of the second user. The signals inputted to the out-ear microphone 210 of the first user may further include environmental noise (N).

Figure 4:
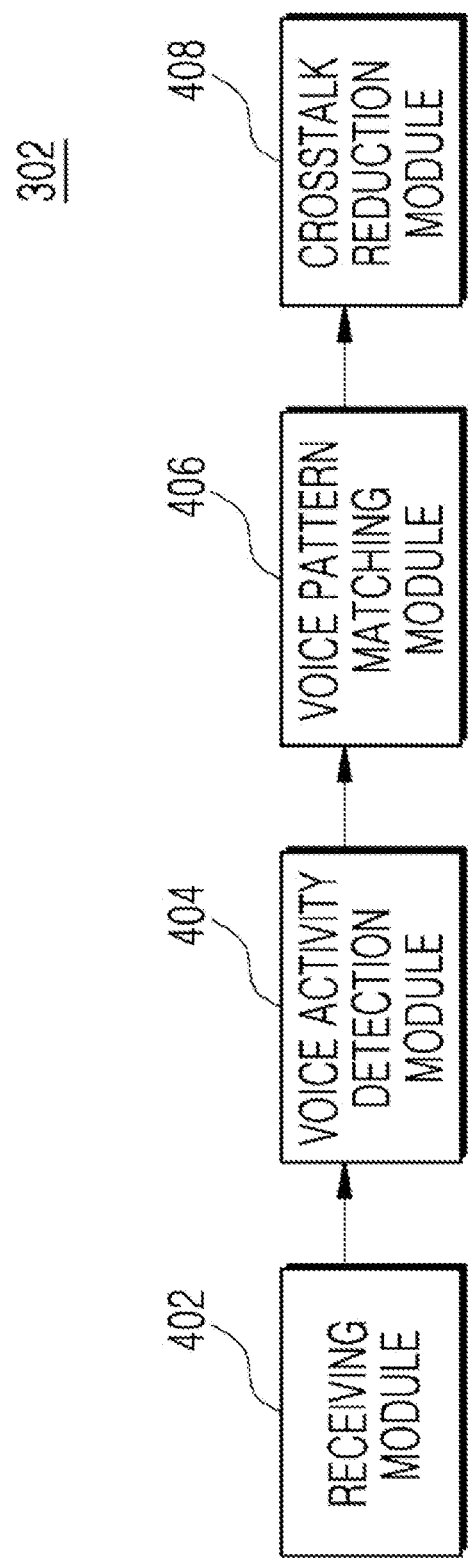
FIG. 4 illustrates a speech recognition module including a crosstalk reduction module, according to some embodiments of the present disclosure.

Hereinafter, the speech recognition module 302 will be described in more detail with reference to FIG. 4 along with FIG. 3. FIG. 4 illustrates the speech recognition module 302 including a crosstalk reduction module 408 according to some embodiments of the present disclosure.

The speech recognition module 302 may further include a voice activity detection (VAD) module 404. The voice activity detection module 404 may be configured to discriminate between a voice section in which a voice of a user is inputted and a non-voice section in which a voice of a user is not inputted. According to some embodiments of the present disclosure, only a signal received via a section determined to be the voice section is processed by the crosstalk reduction module 408 and the processed signal may then be transmitted to the automatic translation module 304.

The signals A+b+environmental noise (N) inputted to the out-ear microphone 210 of the first user is now received by the speech recognition module 302, in particular by a receiving module 402. The speech recognition module 302, in particular the receiving module 402, also receives the voice signal $B_{inear}$ inputted to the in-ear microphone of the second user.

The crosstalk reduction module 408 removes the voice signal b of the second user from the signals A+b inputted to the out-ear microphone of the first user, based on the voice signal $B_{inear}$ inputted to the in-ear microphone of the second user.

More specifically, the speech recognition module 302 may further include a voice pattern matching module 406. The voice pattern matching module 406 extracts a signal component matching the voice signal $B_{inear}$ inputted to the in-ear microphone of the second user from the signals A+b inputted to the out-ear microphone of the first user.

The crosstalk reduction module 408 removes a signal component matching the voice signal $B_{inear}$ inputted to the in-ear microphone of the second user from the signals A+b inputted to the out-ear microphone of the first user. In the preceding description, although the voice pattern matching module 406 and the crosstalk reduction module 408 have been described as separate modules, both may be referred to as a crosstalk reduction module in other embodiments.

As described above, since the signal inputted to the in-ear microphone 220 has significantly less noise, but does not sufficiently contain a high-frequency band component of a human voice, it is difficult for a program or a processor to recognize the human voice based on the signal inputted to the in-ear microphone 220. In addition, it is not desirable to use such recognized voice for translation. According to some embodiments of the present disclosure, since crosstalk caused by the voice signal of the third party can be removed based on a noise-less signal inputted to the in-ear microphone 220 of the third party, the high-frequency band component inputted through the out-ear microphone 210 can be used for automatic speech translation.

As described above, the signal inputted to the out-ear microphone 210 of the first user may further include the environmental noise (N). The speech recognition module 302 may be configured to further remove the environmental noise (N). For example, the voice activity detection module discriminates between a voice section in which a voice of a user is inputted and a non-voice section in which a voice of a user is not inputted. Since the signal in the non-voice section corresponds to the environmental noise (N), the signal in the non-voice section may be removed through noise gating. In addition, in the case of the voice section, the environmental noise (N) may be removed by filtering only a portion in which a frequency band is a voice band.

Now, a signal from which the crosstalk and the environmental noise have been removed, that is, the voice signal A of the first user or the voice signal B of the second user, is transmitted to the automatic translation module 304. The automatic translation module 304 translates the voice signal A or the voice signal B into another language, and the translated sentence is synthesized into speech by the speech synthesis module 106 to be outputted as the synthesized speech.

Figure 5:
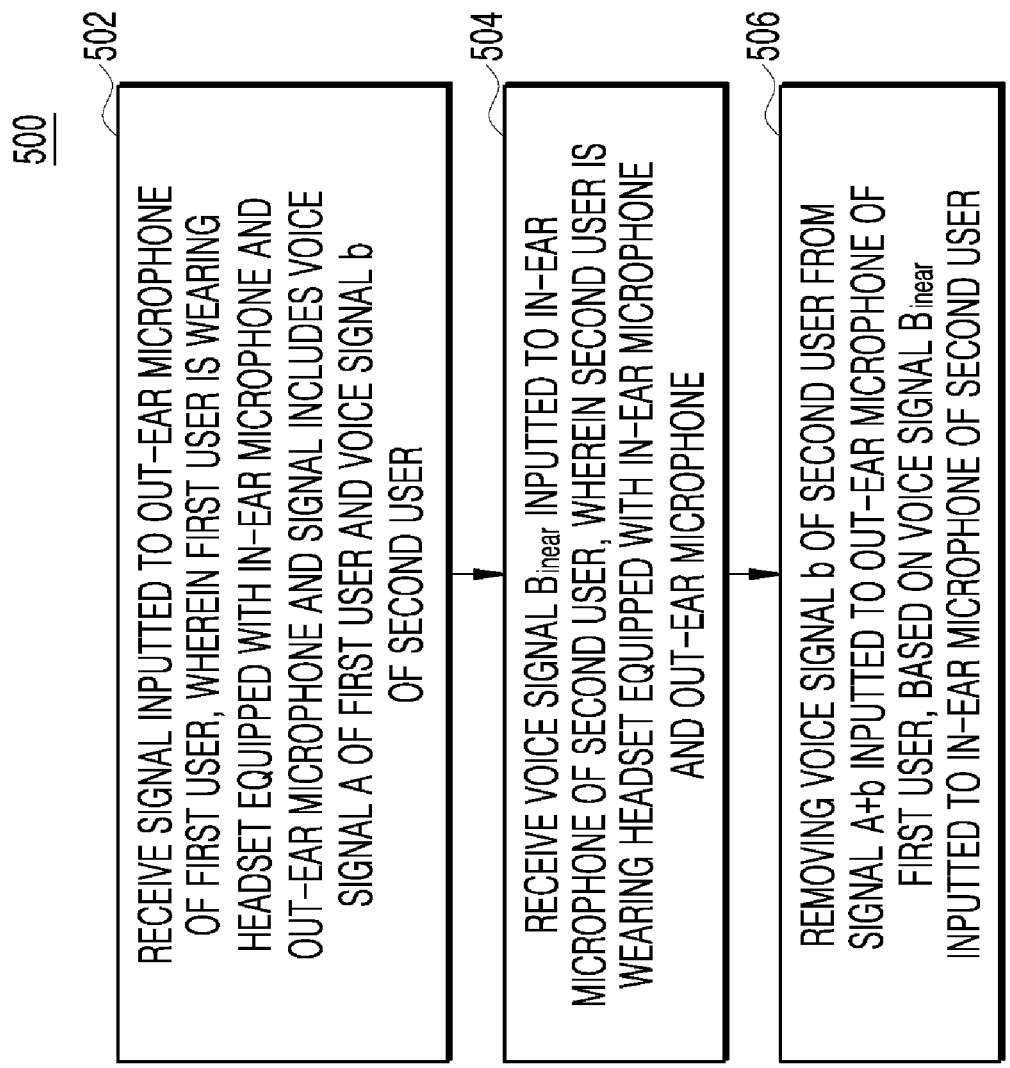
FIG. 5 is a flow diagram of a method for reducing crosstalk, according to one embodiment of the present disclosure.

FIG. 5 is a flow diagram of a method 500 for reducing crosstalk, according to one embodiment of the present disclosure.

The method 500 for reducing crosstalk includes receiving 502 a signal inputted to an out-ear microphone of a first user, wherein the first user is wearing a headset equipped with an in-ear microphone and the out-ear microphone. The signal includes a voice signal A of the first user and a voice signal b of a second user.

The method 500 also includes receiving 504 a voice signal $B_{inear}$ inputted to an in-ear microphone of the second user, wherein the second user is wearing a headset equipped with the in-ear microphone and an out-ear microphone.

The method 500 also includes removing 506 the voice signal b of the second user from the signal A+b inputted to the out-ear microphone of the first user, based on the voice signal $B_{inear}$ inputted to the in-ear microphone of the second user.

Figure 6:
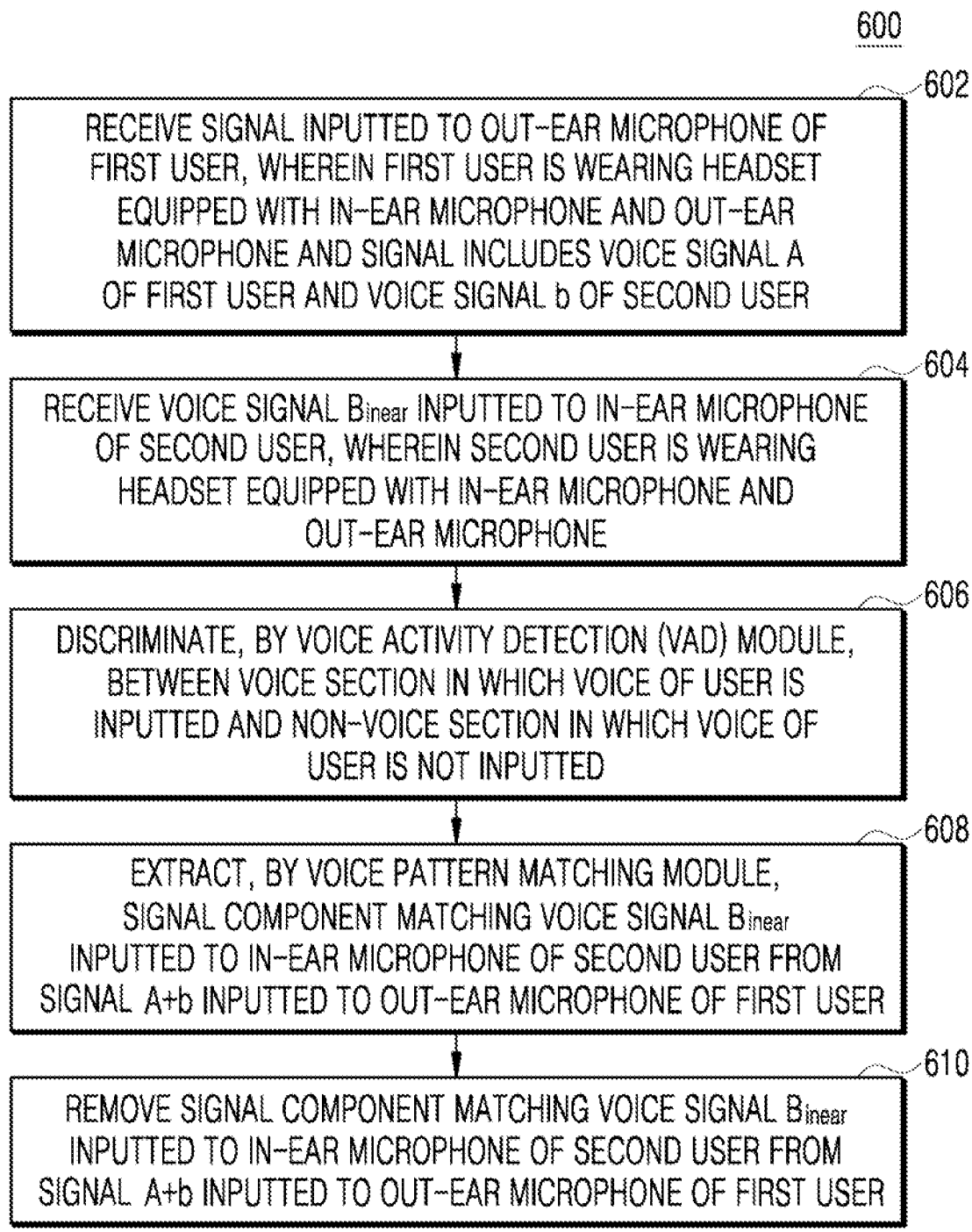
FIG. 6 is a flow diagram of a method for reducing crosstalk, according to another embodiment of the present disclosure.

FIG. 6 is a flow diagram of a method 600 for reducing crosstalk, according to another embodiment of the present disclosure.

The method 600 for reducing crosstalk includes receiving 602 a signal inputted to an out-ear microphone of a first user, wherein the first user is wearing a headset equipped with an in-ear microphone and the out-ear microphone. The signal includes a voice signal A of the first user and a voice signal b of a second user.

The method 600 also includes receiving 604 a voice signal $B_{inear}$ inputted to an in-ear microphone of the second user, wherein the second user is wearing a headset equipped with the in-ear microphone and an out-ear microphone.

The method 600 also includes discriminating 606, by a voice activity detection module, between a voice section in which a voice of a user is inputted and a non-voice section in which a voice of a user is not inputted.

The method 600 also includes extracting 608, by a voice pattern matching module, a signal component matching the voice signal $B_{inear}$ inputted to the in-ear microphone of the second user from the signal A+b inputted to the out-ear microphone of the first user.

The method 600 includes removing 610 the voice signal b of the second user from the signal A+b inputted to the out-ear microphone of the first user, based on the voice signal $B_{inear}$ inputted to the in-ear microphone of the second user.

It should be understood that the embodiments described herein may be implemented in hardware, software, firmware, middleware, microcode, or any combination thereof. For hardware implementation, processing units may be implemented by one or more application specific semiconductors (ASICs), digital signal processors (DSPs), digital signal processing devices (DSPDs), programmable logic devices (PLDs), field programmable gate arrays (FPGAs), processors, controllers, micro-controllers, micro-processors, other electronic units designed to perform the functions described herein, or a combination thereof.

For software implementation, the techniques described herein may be implemented with modules (such as procedures and functions) that perform the functions described herein. A software code can be stored in memory units and executed by processors. The memory unit may be implemented within the processor or external to the processor, in which case it may be communicatively coupled to the processor via various means as is known in the art.

It will be appreciated that the memory described herein may be either volatile memory or non-volatile memory, or may include both the volatile memory and the non-volatile memory. The non-volatile memory may include a read only memory (ROM), a programmable ROM (PROM), an electrically programmable ROM (EPROM), an electrically erasable PROM (EEPROM), or a flash memory. The volatile memory may include random access memory (RAM) that operates as an external cache memory. The RAM is available in many forms, such as synchronous RAM (SRAM), dynamic RAM (DRAM), synchronous DRAM (SDRAM), double data rate SDRAM (DDR SDRAM), enhanced SDRAM (ESDRAM), synclink DRAM (SLDRAM), and direct rambus RAM (DRRAM). The memories disclosed herein include, but are not limited to, these and other suitable types of memory.

What has been described above includes one or more embodiments. Of course, it is not possible to describe all derivable combinations of modules or methods for the purpose of describing the above-described embodiments, but one of ordinary skill in the art will recognize that many additional combinations of various embodiments are possible. Accordingly, the described embodiments are intended to cover all modifications that fall within the spirit and scope of the appended claims. Further, the present disclosure is not to be limited to the embodiments disclosed herein, but is to be accorded the widest scope consistent with the principles and novel features disclosed herein.

The invention claimed is:

1. A method for reducing crosstalk when performing automatic speech translation between at least two users speaking different languages, comprising:
   receiving a signal inputted to an out-ear microphone of a first user, wherein the first user is wearing a headset equipped with an in-ear microphone and the out-ear microphone and the signal includes a voice signal A of the first user and a voice signal b of a second user;
   receiving a voice signal $B_{inear}$ inputted to an in-ear microphone of the second user, wherein the second user is wearing a headset equipped with the in-ear microphone and an out-ear microphone; and
   removing the voice signal b of the second user from the signal A+b inputted to the out-ear microphone of the first user, based on the voice signal $B_{inear}$ inputted to the in-ear microphone of the second user.

2. The method of claim 1, further comprising, prior to removing the voice signal b, discriminating, by a voice activity detection (VAD) module, between a voice section in which a voice of a user is inputted and a non-voice section in which a voice of a user is not inputted, and
wherein removing the voice signal b is performed only on the voice section.

3. The method of claim 1, wherein removing the voice signal b comprises:
extracting, by a voice pattern matching module, a signal component matching the voice signal $B_{inear}$ inputted to the in-ear microphone of the second user from the signal A+b inputted to the out-ear microphone of the first user; and
removing the signal component matching the voice signal $B_{inear}$ inputted to the in-ear microphone of the second user from the signal A+b inputted to the out-ear microphone of the first user.

4. The method of claim 1, further comprising translating the voice signal of the first user from which the voice signal b of the second user has been removed, into another language; and
synthesizing the translated sentence into speech to output the synthesized speech.

5. A device for reducing crosstalk when performing automatic speech translation between at least two users speaking different languages, comprising:
a receiving module configured to:
receive a signal inputted to an out-ear microphone of a first user, wherein the first user is wearing a headset equipped with an in-ear microphone and the out-ear microphone and the signal includes a voice signal A of the first user and a voice signal b of a second user; and
receive a voice signal $B_{inear}$ inputted to an in-ear microphone of the second user, wherein the second user is wearing a headset equipped with the in-ear microphone and an out-ear microphone; and
a crosstalk reduction module configured to remove the voice signal b of the second user from the signal A+b inputted to the out-ear microphone of the first user, based on the voice signal $B_{inear}$ inputted to the in-ear microphone of the second user.

6. The device of claim 5, further comprising a voice activity detection (VAD) module configured to discriminate between a voice section in which a voice of a user is inputted and a non-voice section in which a voice of a user is not inputted.

7. The device of claim 5, further comprising a voice pattern matching module configured to extract a signal component matching the voice signal $B_{inear}$ inputted to the in-ear microphone of the second user from the signal A+b inputted to the out-ear microphone of the first user.

8. The device of claim 5, further comprising:
an automatic translation module configured to translate the voice signal of the first user from which the voice signal b of the second user has been removed, into another language; and
a speech synthesis module configured to synthesize the translated sentence into speech to output the synthesized speech.

9. A device for reducing crosstalk when performing automatic speech translation between at least two users speaking different languages, comprising:
at least one processor; and
a memory coupled to the at least one processor,
wherein the at least one processor is configured to:
receive a signal inputted to an out-ear microphone of a first user, wherein the first user is wearing a headset equipped with an in-ear microphone and the out-ear microphone and the signal includes a voice signal A of the first user and a voice signal b of a second user; and
receive a voice signal $B_{inear}$ inputted to an in-ear microphone of the second user, wherein the second user is wearing a headset equipped with the in-ear microphone and an out-ear microphone; and
remove the voice signal b of the second user from the signal A+b inputted to the out-ear microphone of the first user, based on the voice signal $B_{inear}$ inputted to the in-ear microphone of the second user.

10. A non-transitory computer-readable storage medium in which a program for reducing crosstalk when performing automatic speech translation between at least two users speaking different languages is stored,
wherein the program, when executed by a computer, causes the computer to:
receive a signal inputted to an out-ear microphone of a first user, wherein the first user is wearing a headset equipped with an in-ear microphone and the out-ear microphone and the signal includes a voice signal A of the first user and a voice signal b of a second user;
receive a voice signal $B_{inear}$ inputted to an in-ear microphone of the second user, wherein the second user is wearing a headset equipped with the in-ear microphone and an out-ear microphone; and
remove the voice signal b of the second user from the signal A+b inputted to the out-ear microphone of the first user, based on the voice signal $B_{inear}$ inputted to the in-ear microphone of the second user.

* * * * *